(12) United States Patent
Spetler

(10) Patent No.: US 7,832,262 B2
(45) Date of Patent: Nov. 16, 2010

(54) METHOD OF DETECTING AN OCCURRENCE OF HYDROPLANING OF A TIRE ON A ROAD

(75) Inventor: Frederic Spetler, Lezoux (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 300 days.

(21) Appl. No.: 12/061,973

(22) Filed: Apr. 3, 2008

(65) Prior Publication Data

US 2008/0245455 A1    Oct. 9, 2008

(30) Foreign Application Priority Data

Apr. 6, 2007    (FR)    ................................. 07 02575

(51) Int. Cl.
*G01M 17/02*    (2006.01)
(52) U.S. Cl. ........................................................ 73/146
(58) Field of Classification Search .................. None
See application file for complete search history.

(56) References Cited

U.S. PATENT DOCUMENTS

| | | | | |
|---|---|---|---|---|
| 5,350,035 | A * | 9/1994 | Bodier et al. ................ | 180/271 |
| 5,424,714 | A * | 6/1995 | Kin et al. ..................... | 340/438 |
| 5,502,433 | A * | 3/1996 | Breuer et al. ................ | 340/438 |
| 5,532,678 | A * | 7/1996 | Kin et al. ..................... | 340/438 |
| 5,723,768 | A * | 3/1998 | Ammon ........................... | 73/8 |
| 5,864,056 | A | 1/1999 | Bell et al. ..................... | 73/146 |
| 6,076,035 | A * | 6/2000 | Yanase .......................... | 701/80 |
| 6,666,079 | B2 | 12/2003 | Poulbot et al. ................ | 73/146 |
| 6,666,080 | B2 * | 12/2003 | Buist et al. .................... | 73/146 |
| 6,888,471 | B2 * | 5/2005 | Elsner et al. ............. | 340/686.3 |
| 6,991,013 | B2 | 1/2006 | Poulbot et al. ........... | 152/152.1 |
| 7,267,148 | B2 | 9/2007 | Merino-Lopez et al. .. | 152/152.1 |
| 7,320,246 | B2 * | 1/2008 | Schick et al. ................. | 73/146 |
| 2003/0056579 | A1 | 3/2003 | Poulbot et al. ................ | 73/146 |
| 2003/0101805 | A1 | 6/2003 | Raab ........................... | 73/116 |
| 2004/0036590 | A1 | 2/2004 | Elsner et al. ................ | 340/445 |

(Continued)

FOREIGN PATENT DOCUMENTS

DE    42 42 726 A1    6/1994

(Continued)

*Primary Examiner*—Lisa M Caputo
*Assistant Examiner*—Jermaine Jenkins
(74) *Attorney, Agent, or Firm*—Fitzpatrick, Cella, Harper & Scinto

(57) ABSTRACT

In a method of detecting an occurrence of hydroplaning of a tire of a vehicle travelling on wet ground, a tread of the tire of the vehicle is equipped with one or more sensors each capable of measuring a compression experienced locally by the tread when the tire is rolling on the ground and of producing a signal corresponding to these measurements. According to the method, measurements are obtained of a compression when the tire is rolling on the ground; a signal corresponding to these measurements is produced; a portion of the signal relating to a passing of one or more sensors into an apparent area of contact between the tire and the ground is extracted; an instantaneous value ($\Delta E$, $R_z$), corresponding to a presence of an indirect contact region of the apparent area of contact between the tread and the ground, is determined from the extracted portion of the signal; and an alarm is triggered when the instantaneous value satisfies a given relationship.

11 Claims, 4 Drawing Sheets

U.S. PATENT DOCUMENTS

| | | |
|---|---|---|
| 2005/0188756 A1 | 9/2005 | Morikawa .................... 73/146 |
| 2006/0207319 A1 | 9/2006 | Krozer et al. ................. 73/146 |
| 2007/0295074 A1 | 12/2007 | Kobayakawa ............... 73/146.5 |
| 2008/0011092 A1 | 1/2008 | Miyoshi et al. ............... 73/779 |
| 2008/0210022 A1 | 9/2008 | Rey et al. .............. 73/862.621 |

FOREIGN PATENT DOCUMENTS

| | | |
|---|---|---|
| DE | 102 42 121 A1 | 3/2004 |
| DE | 10 2004 051 654 A1 | 4/2006 |
| EP | 0 937 615 A2 | 8/1999 |
| EP | 1 076 235 A1 | 2/2001 |
| EP | 1 231 120 A1 | 8/2002 |
| EP | 1 350 640 A1 | 10/2003 |
| EP | 1 498 291 A1 | 1/2005 |
| JP | 2002-087032 A | 3/2002 |
| WO | WO 02/08721 A1 | 1/2002 |
| WO | WO 2006/117480 A1 | 11/2006 |

\* cited by examiner

METHOD OF DETECTING AN OCCURRENCE OF HYDROPLANING OF A TIRE ON A ROAD

FIELD OF THE INVENTION

The present invention relates to the detection of the start of hydroplaning of a tire on a wet road traveled on by a vehicle. More particularly, the present invention relates to the detection of the start of hydroplaning based on a measurement of stresses in the tread of the tire of the vehicle.

BACKGROUND

Hydroplaning is characterized by the momentary presence of an amount of water between the ground making up the road and the part of a tire tread in contact with the ground. During hydroplaning, the film formed by the presence of water prevents all or some of this part of the tire tread from contacting the ground, and therefore there is no longer any grip and consequently any transfer of loads between the vehicle and the ground.

A film of water between all or some of the tire tread in contact with the ground is formed when the flow of water circulating between these two surfaces becomes greater than the flow of water that can be removed simultaneously by the roughness of the ground and the pattern of the tire tread. This saturation effect is dependent on the height of water present on the ground and the speed of the vehicle.

The consequences of hydroplaning, during an acceleration by application of a driving force, during a deceleration by application of a braking force, or during a change in direction, are considerable and may involve a partial or complete loss of control of the vehicle. It is therefore of paramount importance when travelling on wet ground to be able to anticipate the conditions for hydroplaning.

To the driver of the vehicle, no warning sign precedes the onset of partial or complete hydroplaning—the danger is sudden and cannot be foreseen.

It is known from U.S. Pat. No. 5,502,433 to detect a risk of hydroplaning based on measurements of shear stresses of a block of the tire tread in an area of contact of the tire tread and the ground.

SUMMARY OF THE INVENTION

An object of the invention is to detect the onset of hydroplaning based on different measurements.

In the following discussion, unless otherwise indicated, the following meanings generally apply:

"apparent area of contact": that portion of the tire tread at which one or more sensors in or on the tire tread give a non-zero signal;

"direct contact area": that portion of the tire tread at which contact between the ground and the tread is a direct contact; and "indirect contact area": that portion of the tire tread at which a film of water lies between the tire tread and the ground.

One subject of the invention is a method of detecting a state of hydroplaning of a tire of a vehicle travelling on wet ground, the tread of the tire being equipped with one or more sensors each capable of measuring a compression undergone or experienced locally by the tread when the tire is rolling on the ground and of producing a signal corresponding to this measurement. The method includes steps of:

obtaining measurements of a compression when a tire is rolling on a ground;

producing a signal corresponding to the measurement;

extracting a portion of the signal relating to a passing of the one or more sensors into an apparent area of contact between a tread of the tire and the ground;

determining an instantaneous value ($\Delta E$, $R_z$), corresponding to a presence of an indirect contact region of the apparent area of contact between the tread of the tire and the ground, from the extracted portion of the signal; and triggering an alarm when the instantaneous value satisfies a given relationship.

The quantity measured by the one or more sensors may advantageously be characteristic of compressive stresses undergone or experienced by the tread of the tire in a direction normal to a plane of the ground.

According to a first implementation of the method, the step of determining an instantaneous value includes:

differentiating the signal;

determining a minimum value $$\left(\frac{d\sigma_z}{dx}\right)_{min}$$

and a maximum value $$\left(\frac{d\sigma_z}{dx}\right)_{max}$$

of the differentiated signal and determining positions of the minimum value and the maximum value ($l_{min}$, $l_{max}$); and calculating the instantaneous value $\Delta E$ based on a difference in position between the minimum and maximum values of the differentiated signal: $\Delta E = l_{min} - l_{max}$.

The position of a measurement point corresponds to a longitudinal reading where a measurement of a compressive stress $\sigma_z$ is taken, along a linear deployment of that part of the tread corresponding the extracted portion of the signal, and $$\frac{d\sigma_z}{dx}$$

represents a first derivative of the stress measurement with respect to x, which represents a position of a sensor along a longitudinal rolling axis X of the tire in the plane of the ground on which the tire is rolling, the sensor being the one making the stress measurement.

Advantageously, an alarm is triggered when the instantaneous value $\Delta E$ exceeds a given threshold.

Experimental measurements carried out with different heights of water on the ground have shown that this instantaneous value $\Delta E$ is very sensitive to the onset of hydroplaning beneath a block of the tread at which measurements are taken, for example a block located at the center of the tread. When the phenomenon of hydroplaning occurs, a sudden increase in the instantaneous value is observed, thereby making the detection of hydroplaning very easy.

According to a complementary implementation of the method, the step of determining an instantaneous value $R_z$ is such that:

when the extracted portion of the signal includes two successive plateaus, the instantaneous value ($R_z$) is equal to:

$$R_z = f(\sigma_{zi}, \sigma_{zd})$$

in which $\sigma_{zi}$ represents an amplitude of compressive stresses of the first plateau and $\sigma_{zd}$ represents an amplitude of compressive stresses of the second plateau; and when the extracted signal portion includes a single plateau, the instantaneous value ($R_z$) is equal to a given constant C.

Advantageously:

$$R_z = \frac{\sigma_{zi} - \sigma_{zd}}{\sigma_{zd}}$$

and C is equal to −1.

Advantageously, an alarm is triggered when the instantaneous value $R_z$ is above a given value or threshold, and preferably when the instantaneous value is positive.

Alternatively, it is possible to have:

$$R_z = \frac{\sigma_{zi}}{\sigma_{zd}}$$

and C is equal to 0. In this case, a warning is preferentially triggered when $R_z$ becomes greater than or equal to 1.

It is also possible, within the scope of the present invention, to use the amplitude $\sigma_{zi}$ as a second criterion.

The threshold preferentially corresponds to a situation in which the two plateaus have substantially the same amplitude. The variation in the second criterion as a function of the rolling speed is progressive.

In contrast, a first criterion is associated with a jump in the value of ΔE that occurs when a front separating the two plateaus becomes less pronounced than that of the first plateau. The threshold for the first criterion is also triggered when the hydroplaning is very marked.

Of course, these two criteria are linked and it is very advantageous to use them together so as to increase the robustness and reliability of the detection of the occurrence of hydroplaning.

Advantageously, two alarms are triggered in succession, a first alarm when a first instantaneous value (ΔE, $R_z$) exceeds a given threshold and a second alarm of higher intensity when a second instantaneous value ($R_z$, ΔE) exceeds a second given threshold.

The method according to the present embodiment of the invention has the advantage of allowing the driver of a vehicle to be warned of a risk of hydroplaning through the use of two physical phenomena associated with hydroplaning. The first corresponds to the occurrence of rising stresses in a measurement tread block, which causes the instantaneous value ΔE to suddenly increase, and the second corresponds to a moment when compressive stresses are substantially equivalent or at a given ratio in that part of the apparent area of contact called an indirect contact and in the second part of the apparent area of contact called the direct contact. In both cases, the driver must be warned that the hydroplaning has become very pronounced. Depending on a type of the tire, the water height, the nature and geometry of the ground, and the scatter in the signal processing and measurements, these two thresholds may be triggered in situations that are quite similar. A priori, the jump associated with the first criterion is usually triggered before that associated with the equivalence between the compressive stresses of the first and second plateaus.

Another subject of the invention is a device for detecting the occurrence of hydroplaning of a tire of a vehicle travelling on wet ground, the device including:

a tire, the tread of which is equipped with one or more sensors each capable of making measurements of compressive stresses undergone or experienced locally by the tread of the tire rolling on the ground;

a transmitter for transmitting a signal corresponding to the measurements of the compressive stresses; and a signal processing unit capable of extracting, from the transmitted signal, a signal portion corresponding to a number or to a duration of passage of the one or more sensors in an area of contact of the tire rolling on the ground.

This device includes, in the processing unit, a program for implementing the above-described method on the basis of the extracted signal portion.

BRIEF DESCRIPTION OF THE DRAWINGS

The invention will be more clearly understood upon reading the following description and examining the accompanying figures. These figures have been given merely by way of example illustrations and in no way do they limit the scope of the invention as claimed.

The figures show.

DETAILED DESCRIPTION OF EMBODIMENTS OF THE INVENTION

Figure 1:
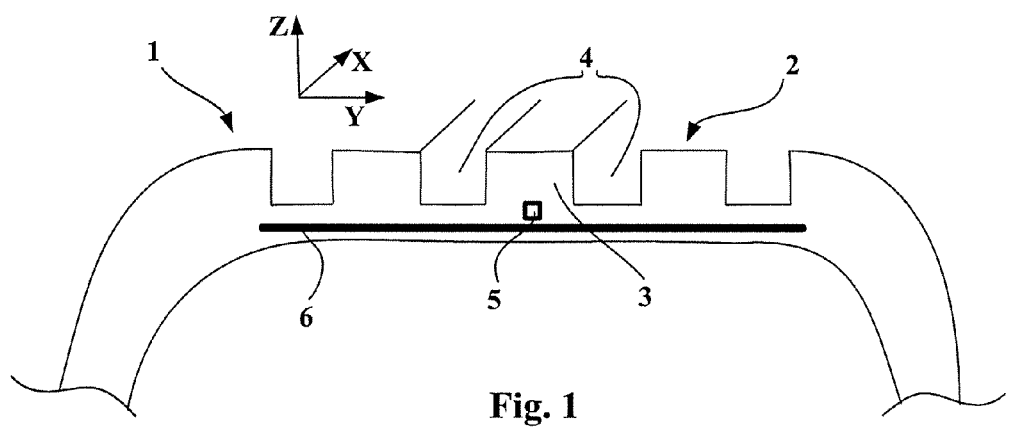
FIG. 1: a schematic representation of a sensor in a tread of a tire.

FIG. 1 shows highly schematically a partial axial cross section of a tire 1 with its tread 2. This tread may also correspond to that of a resilient non-pneumatic tire.

The outer surface of the tread of a tire is not smooth but usually includes a number of longitudinal grooves 4 and transversal or substantially transversal grooves for facilitating water evacuation when the tire travels on wet roads. The longitudinal and transversal grooves define blocks of rubber that come into contact with the road surface and correspond to a pattern of the tread of the tire. In FIG. 1, a rubber block 3 lies between longitudinal grooves 4 and two transversal grooves (not shown).

Some of the blocks 3 include a stress sensor 5 (or a sensor for sensing another equivalent quantity). What is thus obtained is a measurement block. The sensor 5 is implanted into the base of the measurement block 3 and above reinforcing plies 6 of the tire's structure. It is desirable to ensure that the sensor 5 is placed in a volume of the rubber of the tire that does not undergo wear during the lifetime of the tire. In this way, measurements are possible throughout the lifetime of the tire. According to an aspect of the invention, the sensors 5 for measuring stresses are preferably placed in blocks 3 located at the center of the tire's width along the Y-axis of FIG. 1, that is, between the two shoulders of the tire. However, it is readily possible within the context of the invention for the sensor or sensors 5 to be placed in the shoulder.

An objective of each of the sensors is to be able to measure a stress (or a force) experienced by the tire tread 2 or, according to a variant, a displacement or even a strain of this tread 2.

The sensors 5 that may be used operate according to various technologies—for example, they may be piezoelectric or piezoresistive gauges or capacitors. Thus, it is possible, for example, to combine a Hall-effect sensor with a magnetic element, with the whole assembly being embedded in the rubber of the tire. For more details about the technologies that may be employed by the sensors 5, the reader may refer to U.S. Pat. No. 6,666,079, which gives a description of various stress sensors that may be used in a tire.

Figure 2:
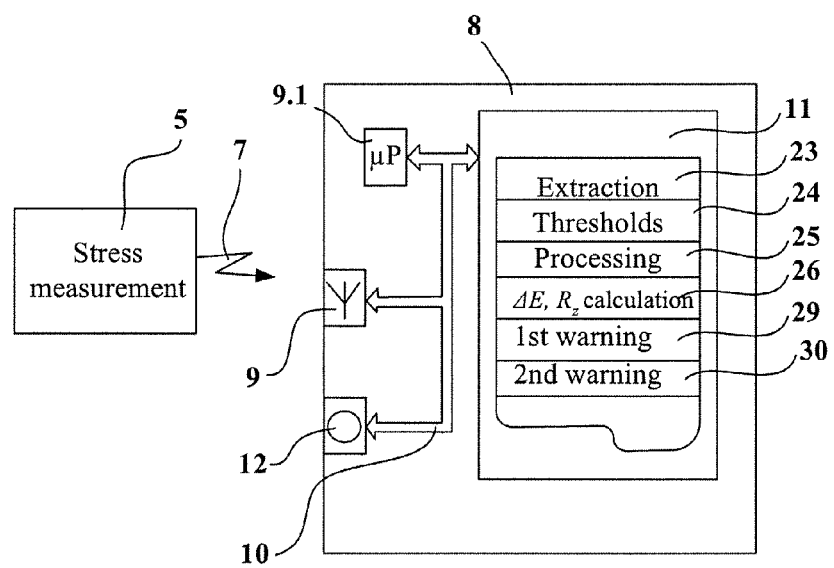
FIG. 2: a schematic representation illustrating a signal processing arrangement according to an embodiment of the invention.

FIG. 2 illustrates a measurement device according to an embodiment of the invention. The device includes the sensor 5 for measuring stresses and a transmitter 7 for transmitting a signal to a signal processing unit 8. A processing module 8 is preferably placed in the vehicle corresponding to the tire under measurement. In a variant, this module 8 may be placed in the tire itself; in this variant, a transmitter is needed for transmitting the processed signal to the driver of the vehicle.

Those skilled in the art will know the various possible forms of transmitters for transmitting a signal between a tire and the vehicle. For this purpose, the reader may refer to European patent document EP-A-1 350 640, which illustrates in particular an antenna implanted in the tire. This antenna is positioned within the actual tread 2 and is linked via a cable to the sensor 5.

The antenna may be an electric field antenna of the quarter-wave type, or may be of a frequency-modulation or amplitude-modulation type for a power signal. It is useful to point out here that a primary antenna fixed on the vehicle facing a secondary antenna placed in the tire also makes it possible, by an inductance effect, to transmit power from the primary antenna, for example connected to a battery of the vehicle, to the secondary antenna so as to deliver energy to the sensor 5. A microbattery inserted with the sensor 5 into a premoulded insert in the tread 2 may also provide this function.

In FIG. 2, the signal corresponding to the stress measurements is transmitted via the transmitter 7 to the processing unit 8 after having been picked up by an antenna 9.

Moreover, the operation of the sensor 5 may take place via an electronic measurement circuit of an ASIC (application-specific integrated circuit) type, a supply system, such as that mentioned above, and a system for encoding the measurements, all of these units operating before transmission of the measurements constituting the signal to be analyzed. The antenna 9 is connected to a microprocessor 11 of the processing unit 8 via an internal connection bus 10.

The processing unit 8 includes a program memory 11. A program stored in the memory 11 makes it possible, according to various program sections, to process the signal until information for the first criterion $\Delta E$ and the second criterion $R_z$ is obtained. Once the information $\Delta E$ has been obtained, via the connection bus 10, the information may be displayed on a display unit 12 placed inside the actual vehicle.

For example, the display unit 12 may take the form of a warning indicator that can have several colors depending on the degree of warning, so as to be easily interpretable. The driver should heed the warnings presented to regulate his speed, such as by reducing his speed or by adapting his type of driving, for example by driving more cautiously and less aggressively.

Figure 3:
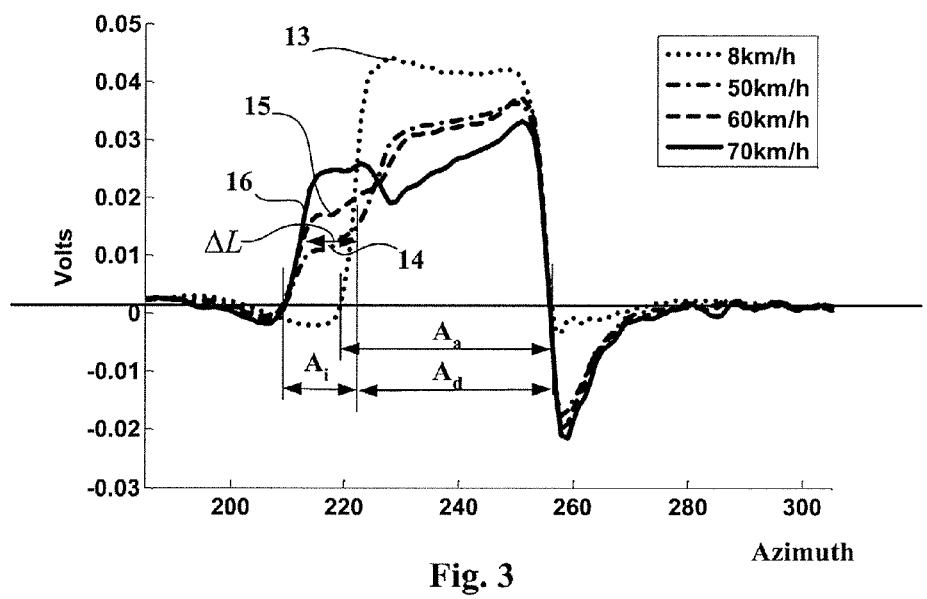
FIGS. 3 and 4: curves corresponding to recordings of measurements of normal stresses in a contact area of the tire as a function of various rolling speeds and for two defined water heights, 2 mm and 8 mm, respectively.

FIG. 3 shows several curves corresponding to signals obtained by normal stress measurements as a function of the tread 2 of the tire 1 rolling along the ground of the road. These various curves correspond to various tire rolling speeds. The scale on the y-axis is arbitrary and corresponds to values given by the sensor 5 in volts. Shown on the x-axis are the positions of measurement points in the contact area according to an order number of the measurements in question. The sampling is carried out with 512 measurements per revolution. These order numbers are directly linked to the respective azimuths of the measurement points.

Thus, the linear deployment of one complete circumference, that is, one complete revolution of the tire under measurement on the road, corresponds on the x-axis, in the current example, to 512 measurement points.

FIG. 3 shows that the measurement signals have almost zero amplitude at the start and at the end of the signals, disregarding a slight offset. To simplify matters, in the case of measuring stresses normal to the ground, that portion of the measurement signals in which the amplitude of these signals is positive is referred to as an "apparent contact area". A positive value of the measurement signals corresponds to compression of the measurement block 3, and a negative value corresponds to extension of the measurement block.

In FIG. 3, the signals were obtained experimentally for a predetermined water height of 2 mm on the road. The measured stresses are those corresponding to compressive stresses undergone or experienced by the tread 2 of the tire 1 and more precisely by a sensor 5 in the tread 2 during its passage in the contact area with a plane of the road, along a direction normal to the plane of the road.

Curve 13 in FIG. 3 represents a signal corresponding to stress measurements for a low tire rolling speed, namely 8 km/h. At this low speed, the presence of a height of water on the road has no effect on the normal stress signal, and the signal detected at this speed corresponds to that which may be found on a completely dry road. Thus, when the stress sensor or sensors lies or lie outside the direct contact area of the tread with the ground of the road, the measured stresses are substantially zero. That part of the curve corresponding to negative stress measurements corresponds to a section of the tread leaving the region of compression on the ground and resuming the natural curvature of the tire.

With the above definition, it is possible to estimate a length of the apparent contact area $A_a$, which in this case is also the direct contact area $A_d$, by the portion of the curve 13 indicated as $A_a$.

Curves 14, 15, and 16 were obtained experimentally for the same water height of 2 mm at speeds of 50, 60, and 70 km/h, respectively. These curves have a substantially different form from that of curve 13. Having normalized all the curves to the point where, to the rear of the contact area, the stress passes through zero again, it may be seen that the apparent contact area $A_a$ is substantially elongated at the start of the contact area. This shows a first plateau, the height of which increases with increasing speed. It is possible to estimate that the length of this first plateau $\Delta L$ corresponds to the length of the indirect contact area $A_i$, that is, the area in which a water film lies between the tread and the ground. It may also be seen that the length of the direct contact area $A_d$ is substantially reduced relative to that of curve 13.

The presence of the first plateau for the signal of curve 14, as soon as the tire is rolling at a speed of for example 40 km/h, is due to the appearance of further stresses.

These further stresses are due to a height of water present just in front of the tire over its entire width, along the Y axis of the tread 2. This height of water thus has the effect of establishing an intermediate contact between the ground of the road and the tread 2 of the tire, before direct contact of a measurement block, that is, a tread block incorporating a sensor, with the ground of the road.

The stress is therefore always generated between the ground and the tread 2 of the tire but via the liquid element that the height of water forms. The first plateau obtained from the signal is therefore that of a sensor detecting a stress on the ground via the liquid element corresponding to this height of water. This signal therefore represents the resistance (hydrostatic pressure) offered by the water to the tire block, which depends on the rolling speed according to $P \approx \frac{1}{2} \rho V^2$ ($\rho$ being the density and V the rolling speed). At low speed, the height of water present does not have the effect of providing the same first plateau on the measured signal, because the entry of the measurement block into the corresponding volume of water requires sufficient speed to create sufficient resistance or tension on the part of the liquid element, and consequently a significant stress.

Figure 4:
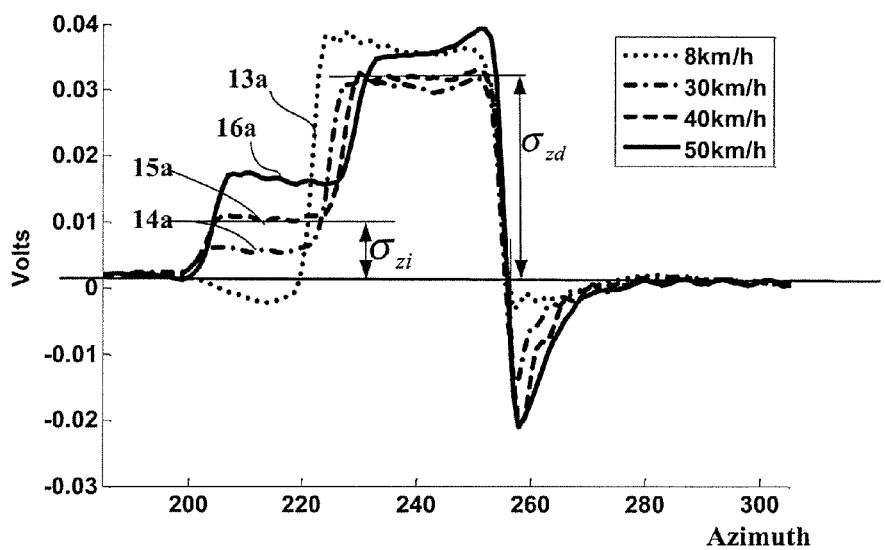

Plotted in FIG. 4 on the y-axis and x-axis, respectively, are the same parameters described in the case of FIG. 3, and also the respective curves 13a, 14a, 15a, and 16a corresponding to tire rolling speeds of 8, 30, 40, and 50 km/h, but for an 8 mm water height on the road.

At a low speed (8 km/h), curve 13a is very substantially identical to curve 13 obtained for a 2 mm water height. For higher vehicle speeds, in this case 30, 40, and 50 km/h, the elongation of the contact area $\Delta L$ on the road is again observed. These results are obtained for a used tire, strictly identical to that providing the results shown in FIG. 3, in this case a Michelin Energy 195/65R15 XHI tire.

In the latter case, that is, for a water height of 8 mm, the elongation $\Delta L$ of the contact area is greater than that obtained for a water height of less than 2 mm, because the height of water present frontally along the width of the tire tread is larger.

Thus, the contact established by the presence of this liquid medium between the tread of the tire and the ground of the road is established higher up on the tire, and therefore contact occurs earlier. The sensor therefore enters earlier into the part corresponding to the apparent area of indirect contact (because this takes place via a water film) between the ground and the tread 2 of the tire 1. That part of the signal corresponding to the elongation $\Delta L$ of the contact area is therefore larger.

Then, starting from a measurement index close to 225, the contact is again a direct contact between the ground and the tread, and the stress signals obtained for curves 14a, 15a, and 16a are substantially identical to that obtained for curves 14, 15, and 16 of FIG. 3.

The passage of a tread sensor into the area of contact with the ground of the road therefore has two parts: a first part ($A_i$) corresponding to contact of the measurement block with the ground of the road, but via a liquid element, and a second part ($A_d$) corresponding to direct contact of the measurement block with the ground of the road.

Figure 5:
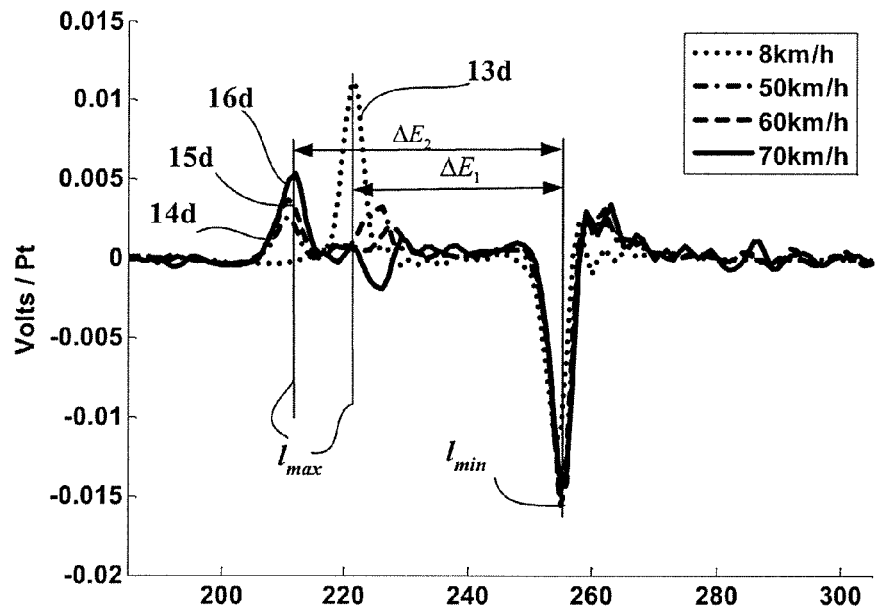
FIGS. 5 and 6: curves corresponding to a first derivative with respect to an x displacement of the sensor along the X axis of the stress measurements illustrated in FIGS. 3 and 4.
Figure 6:
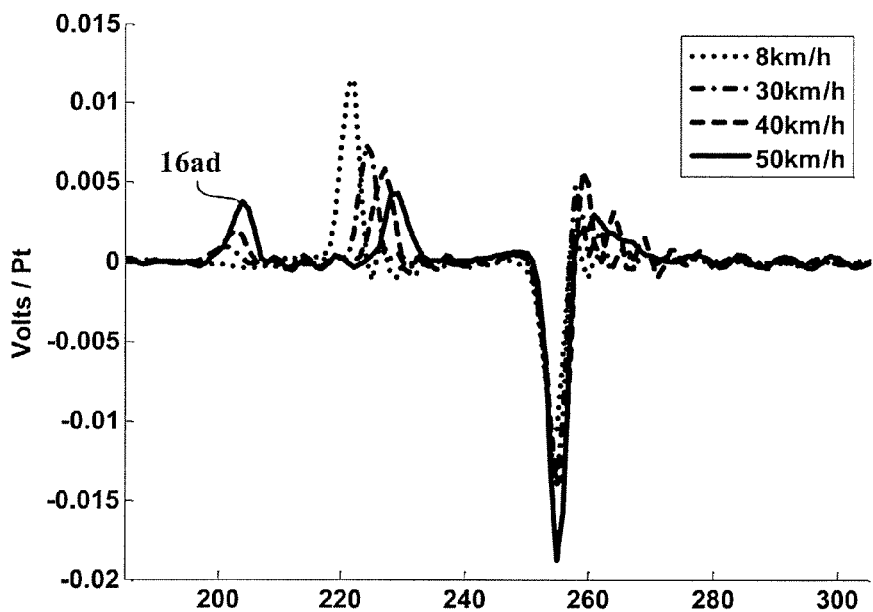

FIG. 5 illustrates calculation results from calculating a first instantaneous value or criterion $\Delta E$ used for detecting the occurrence of hydroplaning according to an embodiment of the invention.

This figure shows curves 13d to 16d representing the first derivatives of the respective compressive stress measurements with respect to the value x of the displacement of a sensor in the longitudinal rolling direction X of the tire. Curves 13d to 16d correspond to the first derivatives of curves 13 to 16 illustrated in FIG. 3, respectively.

For the four curves, the respective minima of the stress measurement derivatives are obtained for a measurement index of 255, that is, on exiting the contact area. The maxima are obtained during the respective phases when the constant stress measurement plateaus appear. What is thus obtained for low speeds, corresponding to curve 13d, is a maximum as soon as the single plateau appears. The value of the first criterion is then $\Delta E_1$. For a higher speed of 50 km/h, corresponding to curve 14d, two positive peaks are observed upon entry into the contact area corresponding to the two successive fronts of the first and second plateaus. For curve 14d, the peak of maximum amplitude is the second one, and the $\Delta E$ value is calculated using this second peak. The corresponding value of the criterion is slightly lower than the initial value of $\Delta E_1$. There is still no jump.

However, in the case of curves 15d and 16d, obtained at speeds of 60 and 70 km/h, the positive peaks of maximum amplitude are the first peaks. Consequently, there is a jump in value of the first criterion.

The instantaneous value $\Delta E$ is expressed as: $\Delta E = l_{min} - l_{max}$, where $l_{min}$ corresponds to the position or azimuth of $$\left( \frac{d\sigma_{dx}}{} \right)_{min},$$

and $l_{max}$, corresponds to the position or azimuth of $$\left( \frac{d\sigma_z}{dx} \right)_{max}.$$

In the case of curve 13a, at low speed, the first criterion has a value $\Delta E_1$ and in the case of curve 16d, obtained at a speed of 50 km/h, the first criterion has a value $\Delta E_2$. $\Delta E_2$ is substantially greater than $\Delta E_1$.

Figure 7:
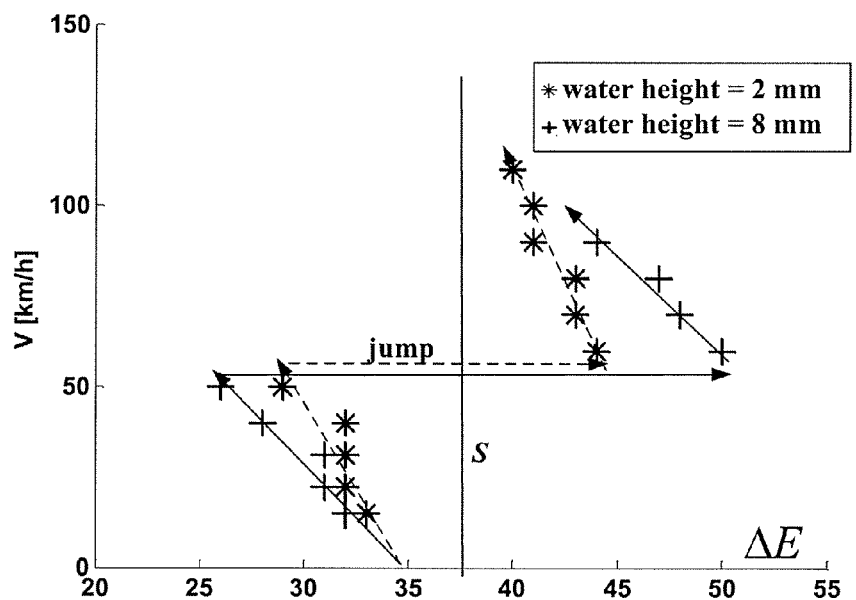
FIG. 7: a graph illustrating a variation of a first criterion ΔE as a function of speed.

This very pronounced difference, illustrated in FIG. 7, has the beneficial effect of providing this first criterion for detecting the occurrence of hydroplaning. As soon as the value of the first criterion, or instantaneous value, becomes greater than a range between 35-40, this means that a jump has taken place. The value of the threshold S advantageously lies within this range. This jump is associated with the evolution of an anticipated plateau or first plateau due to the appearance of an area of indirect contact, that is, a contact with a substantial film of water in front of the tire. As soon as this jump has been detected, a warning that there is a risk of hydroplaning should be sent to the driver. The arrows show the influence of the speed on the change in the first criterion.

FIG. 4 illustrates the calculation of the second criterion or instantaneous value $R_z$. This criterion corresponds to:

$$R_z = \frac{\sigma_{zi} - \sigma_{zd}}{\sigma_{zd}},$$

in which $\sigma_{zi}$ represents the amplitude of the compressive stresses of the first plateau and $\sigma_{zd}$ represents the amplitude of the compressive stresses of the second plateau. Of course, in the case of curve 13a, the value of the criterion is −1, because there is only one plateau.

Figure 8:
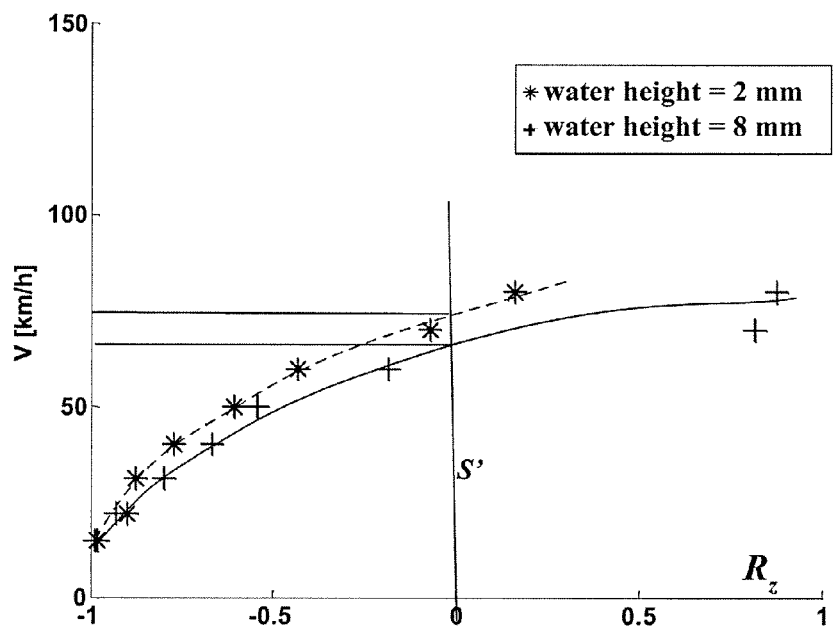
FIG. 8: a graph illustrating a variation in a second criterion $R_z$ as a function of speed.

FIG. 8 shows the variation in the second criterion as a function of speed. It may be seen that its value passes progressively from −1 to zero and then becomes positive. The zero-crossing point corresponds to the moment when the compressive stresses of the first and second plateaus become similar, which means that hydroplaning becomes very pronounced. It is then essential for the driver to be immediately warned of this risk. This zero-crossing point, or a lower value if so desired, may be chosen as the threshold value S'. FIG. 8 also illustrates the variation of the second criterion for two water heights, namely 2 and 8 mm. Not surprisingly, FIG. 8 shows that the higher the speed, the more appreciable the influence of the water height. It may also be noted that, above the zero value of the second criterion, the influence of the speed is very pronounced. A slight change in rolling speed can result in very large changes in the occurrence of hydroplaning.

Returning to the device of FIG. 2, a subprogram 23 of the program 11 of the processing unit 8 is used to extract a part of the signal received from the sensors corresponding to a substantially non-zero stress signal, for example typically above a threshold, in absolute value.

Thus, the extraction of the part of the signal, for compressive stresses, corresponding to one or more sensors passing into the contact area of the tread 2, consists in extracting the part of the signal in which the sensor (or sensors) emits (or emit) a significant stress measurement signal, the duration of this portion of the signal corresponding to the duration of the passage of the sensor (or sensors) through the contact area.

Using a subprogram 25, data processing is carried out so as to calculate the criteria $\Delta E$ and $R_z$ (reference numeral 26). A comparison is then made with thresholds recorded in the data zone 24. A first alarm is triggered if a first criterion exceeds a first threshold (reference numeral 29) and a second alarm is triggered if a second criterion exceeds a second threshold (reference numeral 30).

The invention is not limited to the examples described and shown, and various modifications may be made to them without departing from its scope as defined by the appended claims.

The invention claimed is:

1. A method of detecting an occurrence of hydroplaning of a tire of a vehicle travelling on wet ground, a tread of the tire being equipped with one or more sensors each capable of measuring a compression experienced locally by the tread when the tire is rolling on the ground and of producing a signal corresponding to measurements made by the one or more sensors, the method comprising:
   obtaining measurements of a compression when a tire is rolling on the ground;
   producing a signal corresponding to the measurements;
   extracting a portion of the signal relating to a passing of one or more sensors into an apparent area of contact between a tread of the tire and the ground;
   determining an instantaneous value ($\Delta E$, $R_z$), corresponding to a presence of an indirect contact region of the apparent area of contact between the tread of the tire and the ground, based on the extracted portion of the signal, and;
   triggering an alarm when the instantaneous value satisfies a given relationship, wherein the determining of an instantaneous value $\Delta E$ includes:
   differentiating the signal,
   determining a minimum value $$\left(\frac{d\sigma_{dx}}{dx}\right)_{min}$$

and a maximum value $$\left(\frac{d\sigma_{dx}^z}{dx}\right)_{max}$$

of the differentiated signal and also positions of the minimum value and the maximum value ($l_{min}$, $l_{max}$), and
   calculating the instantaneous value $\Delta E$ to be a difference in position between the minimum and maximum values of the differentiated signal: $\Delta E = l_{max} - l_{min}$.

2. A method according to claim 1, wherein the measurements of the compression are made by the one or more sensors, and the compression is characteristic of compressive forces experienced by the tread of the tire in a direction normal to a plane of the ground.

3. A method according to claim 1, wherein the alarm is triggered when the instantaneous value $\Delta E$ exceeds a given threshold.

4. A method according to one of claims 2 and 3, wherein the determining of an instantaneous value ($R_z$) is such that:
   when the extracted portion of the signal includes two successive plateaus, the instantaneous value ($R_z$) is equal to:

$$R_z = f(\sigma_{zi}, \sigma_{zd}),$$

in which $\sigma_{zi}$ represents an amplitude of compressive stresses of the first plateau and $\sigma_{zd}$ represents an amplitude of compressive stresses of the second plateau, and
   when the extracted portion of the signal includes a single plateau, the instantaneous value ($R_z$) is equal to a constant C.

5. A method according to claim 4, wherein:

$$R_z = f(\sigma_{zi}, \sigma_{zd}) = \frac{\sigma_{zi} - \sigma_{zd}}{\sigma_{zd}},$$

wherein C is equal to −1.

6. A method according to claim 5, wherein the alarm is triggered when the instantaneous value ($R_z$) is positive.

7. A method according to claim 4, wherein:

$$R_z = f(\sigma_{zi}, \sigma_{zd}) = \frac{\sigma_{zi}}{\sigma_{zd}},$$

wherein C is equal to 0.

8. A method according to claim 7, wherein the alarm is triggered when the instantaneous value ($R_z$) is greater than 1.

9. A method according to claim 4, wherein the alarm is triggered when the instantaneous value ($R_z$) is above a given value.

10. A method according to claim 4, wherein, in the triggering of an alarm, first and second alarms are triggered in succession, the first alarm being triggered when a first instantaneous value ($\Delta E$) exceeds a given threshold, and the second alarm of greater intensity being triggered when a second instantaneous value ($R_z$) exceeds a second given threshold.

11. A device for detecting an occurrence of hydroplaning of a tire of a vehicle travelling on wet ground, the tire including tread equipped with one or more sensors each configured to measure compressive stresses experienced locally by the tread rolling on the ground, and the tire including a transmitter for transmitting a signal corresponding to measurements of stresses sensed by the one or more sensors, the device comprising:

a signal processing unit that extracts, from the transmitted signal, a signal portion corresponding to a number or to a duration of passage of the one or more sensors in an area of contact of the tread of the tire rolling on the ground, wherein the signal processing unit is configured to execute a program for implementing a method of detecting an occurrence of hydroplaning based on the extracted signal, the method including:

obtaining measurements from the one or more sensors of a compression when the tire is rolling on the ground;

producing a signal corresponding to the measurements;

extracting a portion of the signal relating to a passing of the one or more sensors into an apparent area of contact between the tread of the tire and the ground;

determining an instantaneous value ($\Delta E$, $R_z$), corresponding to a presence of an indirect contact region of the apparent area of contact between the tread of the tire and the ground, based on the extracted portion of the signal; and triggering an alarm when the instantaneous value satisfies a given relationship, wherein the determining of an instantaneous value $\Delta E$ includes:

differentiating the signal, determining a minimum value $$\left(\frac{d\sigma_{dx}}{}\right)_{min}$$

and a maximum value $$\left(\frac{d\sigma_{dx}^z}{}\right)_{max}$$

of the differentiated signal and also positions of the minimum value and the maximum value ($l_{min}$, $l_{max}$), and calculating the instantaneous value $\Delta E$ to be a difference in position between the minimum and maximum values of the differentiated signal: $\Delta E = l_{max} - l_{min}$.

* * * * *

UNITED STATES PATENT AND TRADEMARK OFFICE
CERTIFICATE OF CORRECTION

Page 1 of 2

PATENT NO. : 7,832,262 B2
APPLICATION NO. : 12/061973
DATED : November 16, 2010
INVENTOR(S) : Frederic Spetler It is certified that error appears in the above-identified patent and that said Letters Patent is hereby corrected as shown below:

COLUMN 1:

Line 23-26, " $\left(\square \dfrac{d}{dx}\right)_{min}$ " should read -- $\left(\dfrac{d\sigma_z}{dx}\right)_{min}$ --;

Line 32-35, " $\left(\square_z \dfrac{d}{dx}\right)_{max}$ " should read -- $\left(\dfrac{d\sigma_z}{dx}\right)_{max}$ --; and Line 49-51, " $\left(\sigma_z \dfrac{d}{dx}\right)_{max}$ " should read -- $-\left(\dfrac{d\sigma_z}{dx}\right)_{min}$ --.

COLUMN 8:

Line 35-38, " $\left(\sigma_{dx} \dfrac{d}{}\right)_{min}$ " should read -- $\left(\dfrac{d\sigma_z}{dx}\right)_{min}$ ,--; and Line 43-46, " $\left(\sigma_z \dfrac{d}{dx}\right)_{max}$ " should read -- $\left(\dfrac{d\sigma_z}{dx}\right)_{max}$ ,--.

Signed and Sealed this
Fourth Day of October, 2011

David J. Kappos
*Director of the United States Patent and Trademark Office*

CERTIFICATE OF CORRECTION (continued)
U.S. Pat. No. 7,832,262 B2

COLUMN 2:

Line 11-13, "$\left(\dfrac{d}{\sigma_{dx}}\right)_{min}$" should read -- $\left(\dfrac{d\sigma_z}{dx}\right)_{min}$ --; and Lines 18-21, "$\left(\dfrac{d}{\sigma^z{}_{dx}}\right)_{max}$" should read -- $\left(\dfrac{d\sigma_z}{dx}\right)_{max}$ --.

COLUMN 12:

Line 13-16, "$\left(\dfrac{d}{\sigma_{dx}}\right)_{min}$" should read -- $\left(\dfrac{d\sigma_z}{dx}\right)_{min}$ --; and Lines 21-24, "$\left(\dfrac{d}{\sigma^z{}_{dx}}\right)_{max}$" should read -- $\left(\dfrac{d\sigma_z}{dx}\right)_{max}$ --.